United States Patent [19]
Glassman

[11] 3,710,793
[45] Jan. 16, 1973

[54] CATAMENIAL TAMPON

[76] Inventor: Jacob A. Glassman, 1680 Meridan Ave., Miami Beach, Fla. 33139

[22] Filed: May 17, 1971

[21] Appl. No.: 143,838

Related U.S. Application Data

[62] Division of Ser. No. 875,903, Nov. 12, 1969, Pat. No. 3,618,605.

[52] U.S. Cl. .................................................. 128/285
[51] Int. Cl. ................................................ A61f 13/20
[58] Field of Search .............................. 128/270, 285

[56] References Cited

UNITED STATES PATENTS

| | | |
|---|---|---|
| 1,932,383 | 10/1933 | Richardson .......................... 128/285 |
| 2,057,206 | 10/1936 | Pohl .................................... 128/285 |
| 2,499,414 | 3/1950 | Rabell ................................. 128/285 |
| 3,079,921 | 3/1963 | Brecht et al. ........................ 128/285 |
| 3,340,874 | 9/1967 | Burgeni ............................... 128/285 |
| 3,491,758 | 1/1970 | Mullan ................................ 128/285 |
| 3,572,341 | 3/1971 | Glassman ........................... 128/285 |
| 3,618,605 | 11/1971 | Glassman ........................... 128/285 |
| 3,624,746 | 11/1971 | Grad et al. .......................... 128/285 |

Primary Examiner—Charles F. Rosenbaum
Attorney—Elmer L. Zwickel

[57] ABSTRACT

A normally compacted tampon comprised of a laminated structure which embodies a central core of highly compressed absorbent material arranged between outer layers of absorbent material to initially absorb menstrual fluids and expand so as to spread the outer layers.

6 Claims, 3 Drawing Figures

PATENTED JAN 16 1973 3,710,793

Inventor.
Jacob A. Glassman
Elmer L. Quickel
Atty.

CATAMENIAL TAMPON

This application is a division of my co-pending application Ser. No. 875,903, filed Nov. 12, 1969, now U.S. Pat. No. 3,618,605.

The invention relates to improvements in catamenial tampons and is more particularly concerned with a critical arrangement of highly absorptive layers of material which, when compressed into tampon form and placed in use, will allow menstrual flow to be directed initially into the interior of the tampon, leaving the exterior surface substantially dry until the very end of its useful life. This tampon is characterized by the presence therein of a novel normally compressed expansible fluid absorbent body or core to insure maximum total expansion of its layers of fluid absorbent material. It also includes within its mass a layer of deodorant or hygienic medicinal impregnated gauze and a flow control layer of moisture impervious material which is perforated to allow for the controlled passage of waste fluids therethrough.

The tampon disclosed herein embodies a pair of layers of highly moisture absorbent material, such as cotton, having a normally highly compressed core of absorbent material, also cotton, disposed between them. Stitching may secure the core and the layers together along a center line so that the assembly can be compacted, prior to use, into a tampon-like shape. When the tampon is placed within the vaginal passage menstrual fluids are initially absorbed by the core which expands dynamically to effectively spread the layers and effectively fill the vaginal passage. Such dynamic expansion of the core is insured by arranging a layer of moisture impervious material between the core and the layers to insure that all initial fluid flow enters the compressed core.

It is therefore an object of this invention to provide an improved catamenial tampon.

Another object is to provide a catamenial tampon with an innermost normally compressed highly expansible core of fluid absorbent material.

Another object is to provide a tampon structure which possesses maximum absorptive properties and so constructed as to direct menstrual fluids initially into the interior thereof.

Another object is to provide a tampon of the character referred to with a highly absorptive normally compressed center core and highly absorbent non-compressed outer layers with a moisture flow retardant shield between the core and said layers.

Another object is to provide a catamenial tampon of the character referred to which is not expensive or difficult to manufacture, and which is very effective in use.

Other objects and advantages of the invention will become apparent with reference to the following description and accompanying drawings.

Figure 1:
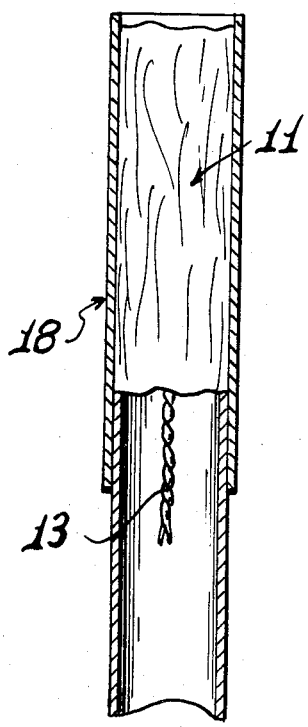
FIG. 1 is a view showing the tampon compacted and enclosed in an applicator tube, the latter being shown in section.
Figure 2:
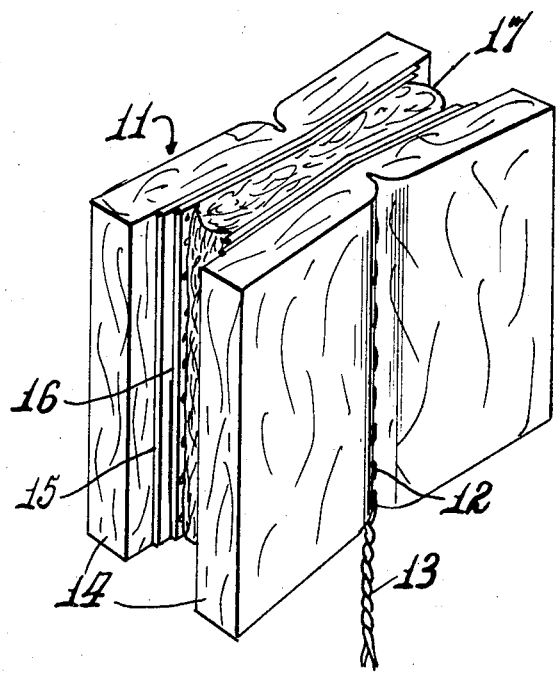
FIG. 2 is a perspective view of the tampon before it is compacted for insertion into the applicator tube.

Referring to the exemplary form of tampon illustrated in the accompanying drawings, the tampon 11 is fabricated from a substantially square laminated mass having a longitudinal row of securing stitches 12 which terminate in a pull string 13. The tampon 11 is comprised of outer layers 14 of non-compressed cotton fibers each having on its inside face a layer of deodorant-impregnated gauze 15 overlaid with a sheet of moisture impervious material 16. Arranged between the opposed faces of sheet material 16 is a normally highly compressed wad or core of moisture absorbent material 17, such as compressed cotton fibers. The impervious sheets 16 preferably are perforated, as at 16a, for a purpose to be explained presently. Preferably, the moisture impervious sheet 16 is less in width than the outer layers 14, and the core 17 is less in width than the said sheet. The tampon is conventially compacted into an applicator tube 18.

Figure 3:
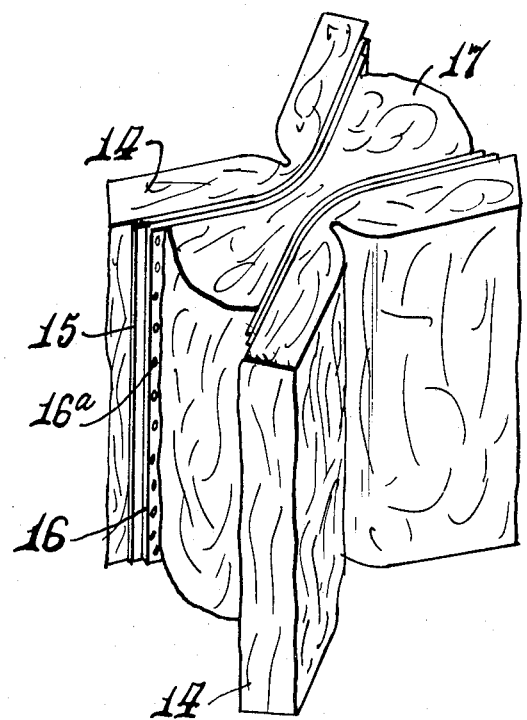
FIG. 3 is a perspective view similar to FIG. 2, showing the tampon expanded following absorption of menstrual fluids by the core while in place in a vaginal passage.

When the tampon is withdrawn from the tube 18 and fitted into a vaginal passage, and menstrual fluids are being absorbed thereby, there is substantial initial absorption by the centrally located compact core 17. When the core becomes saturated there will be some restricted fluid flow outwardly through the perforations 16a in sheets 16. The initial saturation by compressed core 17 causes said core to expand dynamically thus spreading the overlying outer layers 14, substantially in the manner shown in FIG. 3, so as to substantially fill the vaginal passage. Subsequent discharge of menstrual fluids will result in said fluids than being readily absorbed by the outer absorbent layers 14 instead of by-passing the tampon. This structure thus insures maximum absorption of fluids by the tampon and extra safety by avoiding any premature spill-over or flow through, soiling the under clothing.

It should be evident that applicant has disclosed a tampon that has maximum initial attraction for collecting waste fluids into its interior region and which retards fluid absorption into its outer regions to thereby provide maximum external dryness and protection with no strike-through or spillage prior to total saturation by the entire tampon. In this manner the useful life of the tampon is prolonged without discomfort, premature feeling of wetness, or actual wetting of undergarments.

I claim:

1. A tampon of the character described comprising an elongated generally cylindrical body made up of substantially rectangular outer layers of soft, highly fluid absorbent material, a substantially rectangular mass of fluid absorbent fibrous material in a state of high compression arranged between said layers, and means securing said layers and mass together substantially along their longitudinal center, the construction being such that when the assembly is compacted into its cylindrical body form the mass is enclosed within the outer layers in such manner that upon being wetted the mass will expand and in so doing will spread the outer layers in their non-secured areas.

2. The tampon recited in claim 1, in which the outer layers are of greater width than the mass.

3. The tampon recited in claim 1, in which a layer of moisture resistant material is arranged between the mass and each layer.

4. The tampon recited in claim 1, in which a perforated layer of moisture resistant material is arranged between the mass and each layer.

5. The tampon recited in claim 4, in which a layer of medication impregnated gauze lies between each layer of moisture resistant material and its related outer layer.

6. The tampon recited in claim 1, in which the outer layers and the mass are substantially rectangular and are secured together centrally by stitches.

* * * * *